United States Patent [19]

Yamano et al.

[11] Patent Number: 5,717,680
[45] Date of Patent: Feb. 10, 1998

[54] INFORMATION PROCESSING APPARATUS WITH MECHANISM FOR ADJUSTING INTERVAL BETWEEN SUBSTRATE FOR SUPPORTING A PLURALITY OF PROBES AND RECORDING MEDIUM

[75] Inventors: Akihiko Yamano, Sagamihara; Ryo Kuroda, Kawasaki, both of Japan

[73] Assignee: Canon Kabushiki Kaisha, Tokyo, Japan

[21] Appl. No.: 825,064

[22] Filed: Mar. 27, 1997

Related U.S. Application Data

[63] Continuation of Ser. No. 405,714, Mar. 17, 1995, abandoned.

[30] Foreign Application Priority Data

Mar. 18, 1994 [JP] Japan ................... 6-048735

[51] Int. Cl.⁶ ................................................. G11B 9/00
[52] U.S. Cl. ................................................. 369/126
[58] Field of Search ................... 369/126, 43, 93; 250/306, 307

[56] References Cited

U.S. PATENT DOCUMENTS

| | | | |
|---|---|---|---|
| 5,287,342 | 2/1994 | Kish et al. | 369/126 |
| 5,357,108 | 10/1994 | Suzuki et al. | 369/126 |
| 5,392,275 | 2/1995 | Kawada et al. | 369/126 |
| 5,394,388 | 2/1995 | Hatanaka et al. | 369/126 |
| 5,396,453 | 3/1995 | Kawada et al. | 369/126 |
| 5,412,641 | 5/1995 | Shinjo et al. | 369/126 |
| 5,418,771 | 5/1995 | Kasanuki et al. | 369/126 |
| 5,461,605 | 10/1995 | Takimoto et al. | 369/126 |
| 5,481,528 | 1/1996 | Eguchi et al. | 369/126 |

FOREIGN PATENT DOCUMENTS

| | | | |
|---|---|---|---|
| 553938 | 8/1993 | European Pat. Off. | 369/126 |
| 63-161552 | 7/1988 | Japan . | |
| 63-161553 | 7/1988 | Japan . | |
| 4-263142 | 9/1992 | Japan | 369/126 |

OTHER PUBLICATIONS

G. Binnig et al., Phys. Rev. Lett. 49, 57 (1982), "Surface Studies By Scanning Tunneling Microscopy".

*Primary Examiner*—Nabil Hindi
*Attorney, Agent, or Firm*—Fitzpatrick, Cella, Harper & Scinto

[57] ABSTRACT

An information processing apparatus for recording and/or reproducing information on and/or from a recording medium using a plurality of probes includes a plurality of probes and a substrate for supporting the plurality of probes. A first electrode is provided on the substrate and a second substrate is provided on the recording medium. An electrostatic capacitance between the first and second electrodes is detected so that an interval between the substrate and the recording medium is adjusted on the basis of the detection result. One of the first and second electrodes has a plurality of electrodes end faces with different heights.

6 Claims, 6 Drawing Sheets

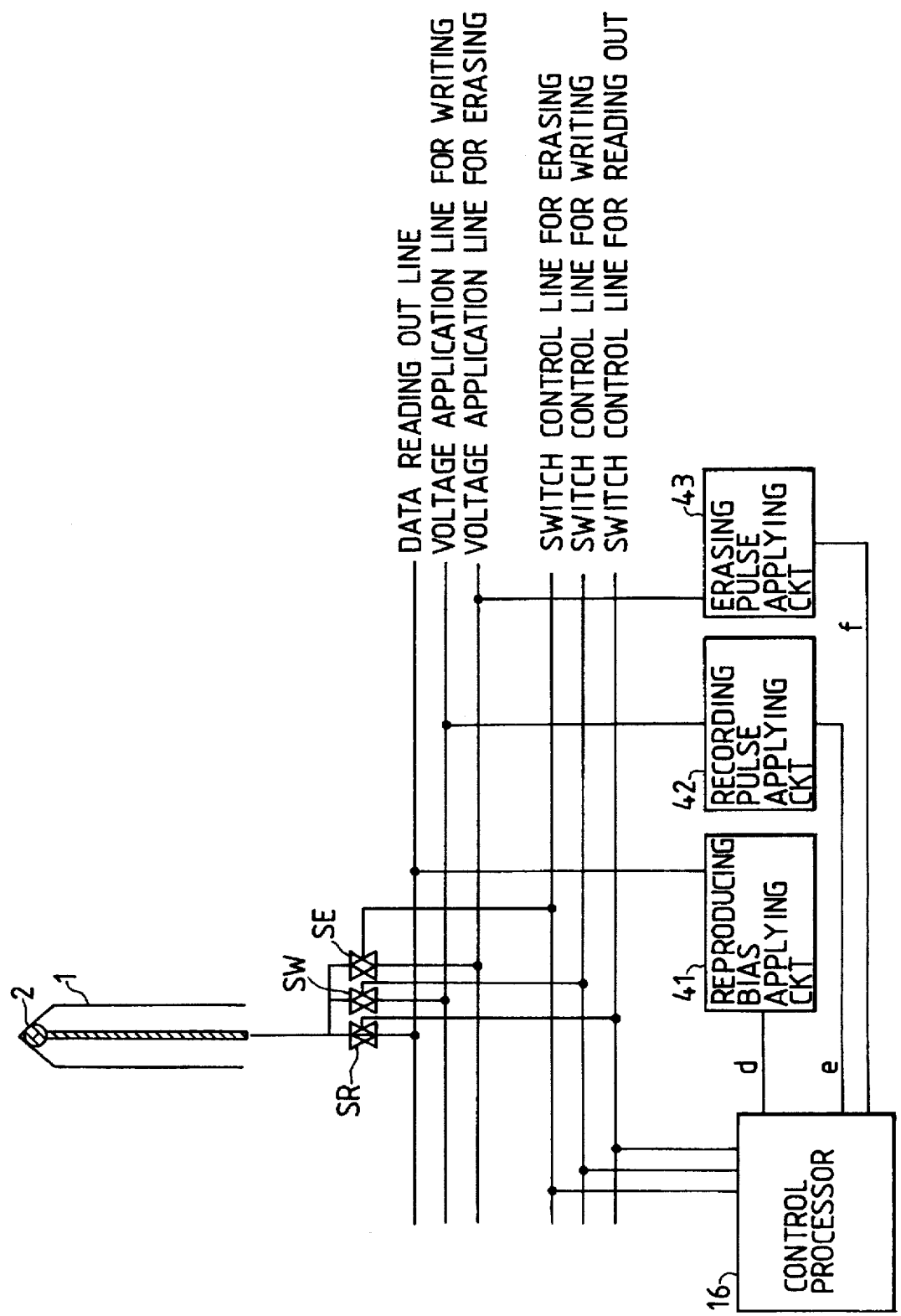

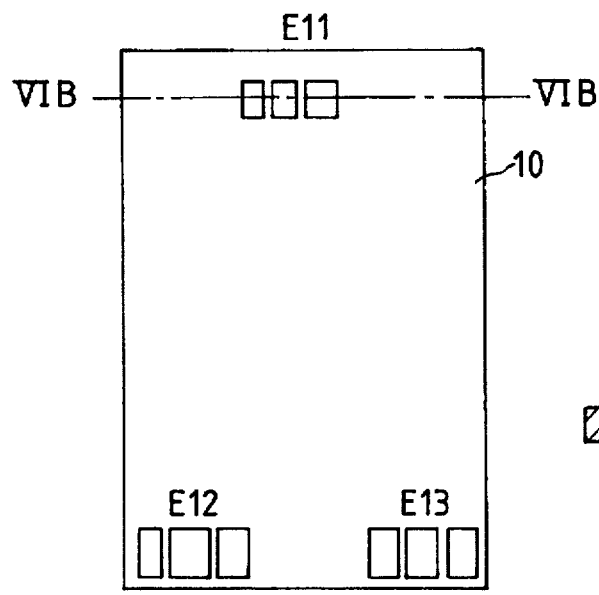
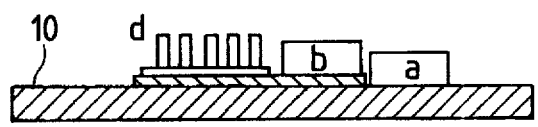
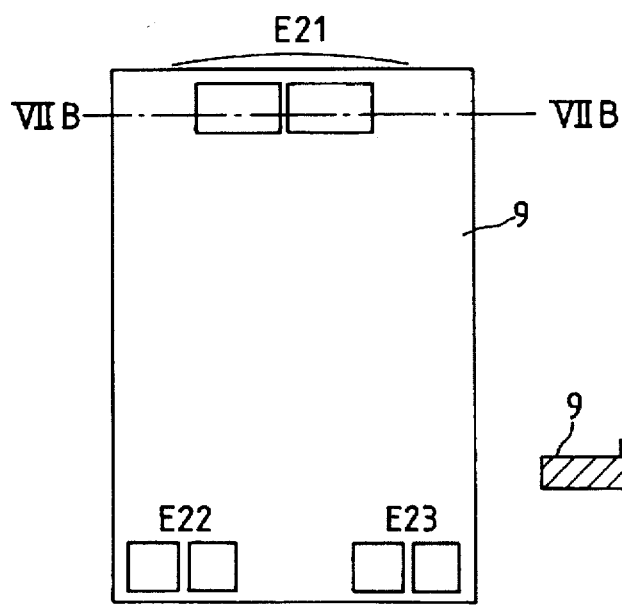
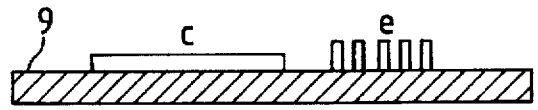

INFORMATION PROCESSING APPARATUS WITH MECHANISM FOR ADJUSTING INTERVAL BETWEEN SUBSTRATE FOR SUPPORTING A PLURALITY OF PROBES AND RECORDING MEDIUM

This application is a continuation of application Ser. No. 08/405,714, filed Mar. 17, 1997, now abandoned.

BACKGROUND OF THE INVENTION

1. Field of the Invention

The present invention relates to a high-density, large-capacity information processing apparatus having a plurality of probes and, more particularly, to the adjustment of the interval between a substrate for supporting a plurality of probes and a recording medium.

2. Related Background Art

In recent years, a scanning tunnel microscope (to be abbreviated as STM hereinafter) with which the electron structure of a surface atom of a conductor can be directly observed has been developed [G. Binnig et al. Phys. Rev. Lett. 49, 57 (1982)], and a real space image of the conductor surface can be measured at a high resolution on the atomic order independently of the crystal state (single crystal or amorphous).

The STM utilizes a phenomenon in that a tunneling current flows when a voltage is applied across a metal probe and a conductive material, and the distance between the two is set to be as close as about 1 nm. This current is very sensitive to a change in distance between the probe and the conductive material. By scanning the probe while maintaining a constant tunnel current, various kinds of information associated with the total electron cloud in the real space can be read. The resolution in the in-plane direction at that time is about 0.1 nm.

Therefore, high-density recording/reproduction can be sufficiently realized on the atomic order (sub-nanometers) upon application of the principle of the STM. For example, a method of performing recording/reproduction by utilizing the principle of the STM using, as a recording layer, a thin film layer consisting of materials, such as conjugated π-electron-based organic compounds, chalcogenides, or the like, which have a memory effect with respect to the switching characteristics of a voltage/current, has been proposed [Japanese Laid-Open Patent Application Nos. 63-161552 and 63-161553]. According to this method, if the recording bit size is 10 nm, large-capacity recording/ reproduction as large as $10^{12}$ bits/cm$^2$ can be realized.

Also, an apparatus which aims at miniaturization and performs recording by displacing a recording medium opposing a semiconductor substrate on which a plurality of probes are formed, has been proposed. For example, upon combination of a multi-probe head constituted by forming 2,500 probes on a 1-cm$^2$ square silicon chip in a 50×50 matrix with the above-mentioned material with the memory effect, recording/reproduction of digital data of 400 Mbits/ probe, i.e., a total recording capacity of 1 Tbits can be realized.

Furthermore, when probes which are arranged in a matrix on a substrate are used like in the above-mentioned prior art, surface alignment for adjusting the parallelism between the substrate on which the probes are formed and the recording medium surface, i.e., interval adjustment, is performed as follows so as to allow all the probes to access the recording medium.

As shown in FIGS. 1A to 1C, surface alignment electrodes E11, E12, and E13 (FIG. 1A), and E21, E22, and E23 (FIG. 1B) are respectively formed on the corners of the lower surface of the substrate formed with the probes (to be referred to as a probe-side substrate hereinafter) and on the corners of the upper surface of the recording medium-side substrate so as to oppose each other. Then, electrostatic capacitances C1, C2, and C3 between the opposing electrodes (e.g., E11 and E21; FIG. 1C) are detected, and the detected values are balanced to control the parallelism to be constant at a certain relative distance d1 between the probe-side substrate and the recording medium. Also, an interdigital electrode shown in FIG. 1D is added and is utilized in positioning in the horizontal direction since its output is modulated upon movement in the horizontal direction.

In the above-mentioned surface alignment, since the absolute value of the distance between the electrodes cannot be detected from the detected electrostatic capacitance Ci (i=1 to 3), a feedback system for slightly changing the tilt angle between the substrate and the medium each time the electrostatic capacitances are detected must be arrangement, and hence, the interval adjustment requires much time, thus deteriorating the performance of the apparatus. When the electrostatic capacitances between the electrodes and the absolute distance are calibrated in advance using another means, the above-mentioned problem can be solved. However, due to variations of the elements in the manufacture, calibration must be executed in units of elements, and a change in detection sensitivity due to contamination over time cannot be coped with. For this reason, the apparatus cost increases, and the service life is shortened.

When positioning in the horizontal direction is performed, since the interdigital electrode and the surface alignment electrodes have different detection sensitivities due to their different areas, they have different inter-electrode distances at which an optimal S/N ratio can be obtained. For this reason, distance control must be performed in each of movement and surface alignment, resulting in complicated control.

SUMMARY OF THE INVENTION

It is an object of the present invention to provide an information processing apparatus which comprises a low-cost, high-durability interval adjustment mechanism, In order to achieve the above object, there is provided an information processing apparatus for recording and/or reproducing information on and/or from a recording medium using a plurality of probes, comprising:

a plurality of probes;

a substrate for supporting the plurality of probes;

a first electrode arranged on the substrate;

a second electrode arranged on the recording medium;

means for detecting an electrostatic capacitance between the first and second electrodes; and means for adjusting an interval between the substrate and the recording medium on the basis of a detection result of the detection means, wherein one of the first and second electrodes has a plurality of electrode end faces with different heights.

BRIEF DESCRIPTION OF THE DRAWINGS

1C is a view showing formation of an electrostatic capacitance by opposing electrodes for surface alignment.

FIG. 5 is a diagram showing principal part of the recording/reproduction/erasing arrangement of an information processing apparatus according to the present invention;

FIG. 6A is a bottom view showing the electrode arrangement on a probe-side substrate, and FIG. 6B is an enlarged sectional view of th electrode arrangement taken along a line VIB—VIB shown in FIG. 6A;

FIG. 7A is a bottom view showing the electrode arrangement on the recording medium side, and FIG. 7B is an enlarged sectional view of the electrode arrangement taken along a line VIIB—VIIB shown in FIG. 7A.

DETAILED DESCRIPTION OF THE PREFERRED EMBODIMENTS

The basic principle of the present invention will be described below with reference to FIG. 2.

Figure 1A:
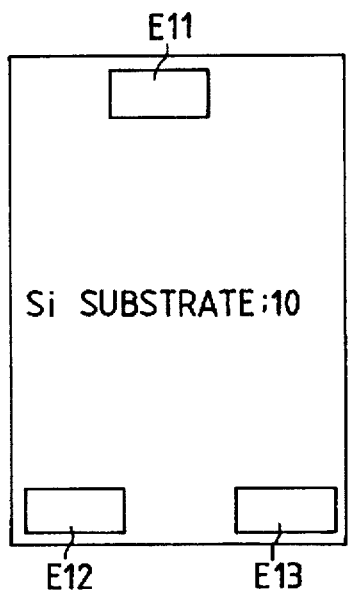
FIG. 1A is a bottom view of a probe-side substrate.
Figure 1B:
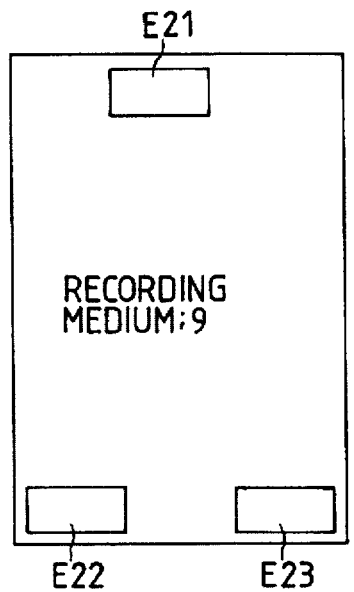
FIG. 1B is a top view of a recording medium-side surface, FIG.
Figure 1C:
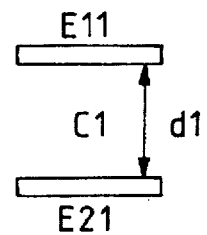
FIG. 1D is a view showing an interdigital electrode.
Figure 1D:
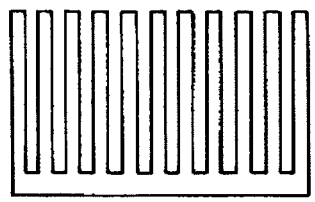
Figure 2:
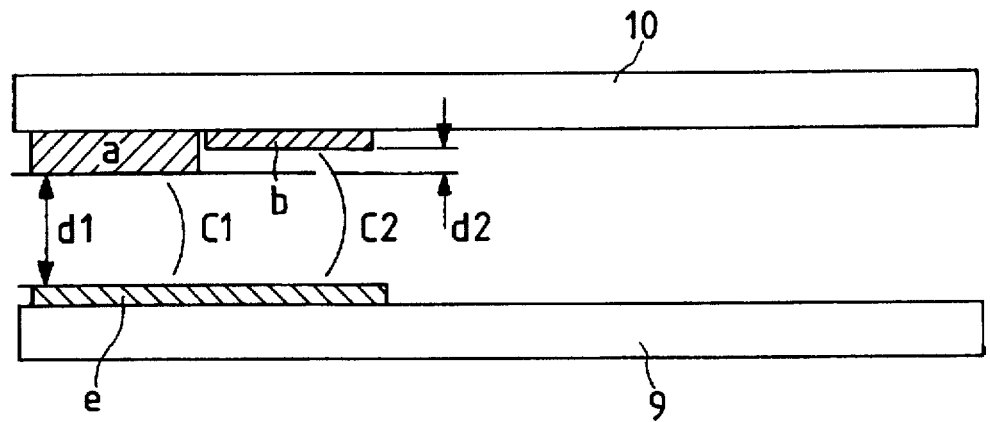
FIG. 2 is an explanatory view of the electrostatic capacitances formed between opposing electrodes with different distances.

FIG. 2 is a view for explaining the electrostatic capacitances formed between opposing electrodes with different distances. Referring to FIG. 2, electrodes a and b are formed on an Si substrate 10 (probe support substrate), and the thicknesses of the electrodes a and b are different from each other by $d_2$. An electrode e is formed on a recording medium 9 to oppose the electrodes a and b. In FIG. 2, $C_1$ is the electrostatic capacitance between the electrodes a and e which are separated by an interval $d_1$, and $C_2$ is the electrostatic capacitance between the electrodes b and e which are separated by an interval $d_1+d_2$.

As shown in FIG. 2, since the following relation (equation (1)) is established between the electrostatic capacitances $C_1$ and $C_2$ detected by the first electrodes a and b, and the interval $d_1$ of the second electrode e (when the difference in thickness of the electrodes is represented by $d_2$, and the area ratio between the two electrodes a and b is r), an absolute distance $d_1$ between the probe-side substrate and the recording medium can be detected.

$$d_1/d_2 = C_2/(C_1 \times r - C_2) \qquad (1)$$

Therefore, since correction can be achieved by an openloop system even in interval adjustment, the time required for the interval adjustment can be shortened, calibration is not required, and a change in sensitivity over time need not be taken into account.

The embodiment of an information processing apparatus according to the present invention will be described below.

Figure 3A:
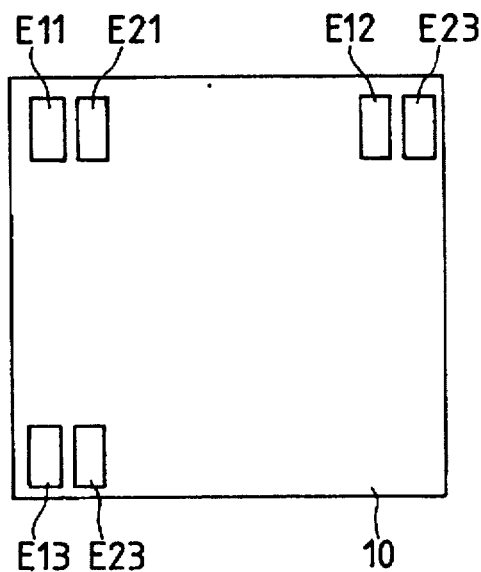
FIG. 3A is a bottom view showing the electrode arrangement on a probe-side substrate.
Figure 3B:
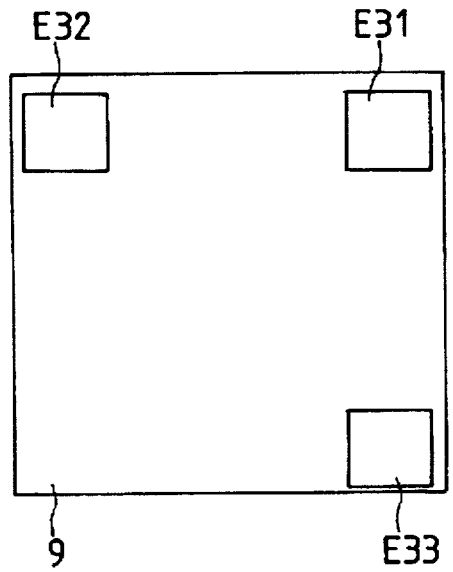
FIG. 3B is a top view showing the electrode arrangement of the recording medium side.
Figure 4:
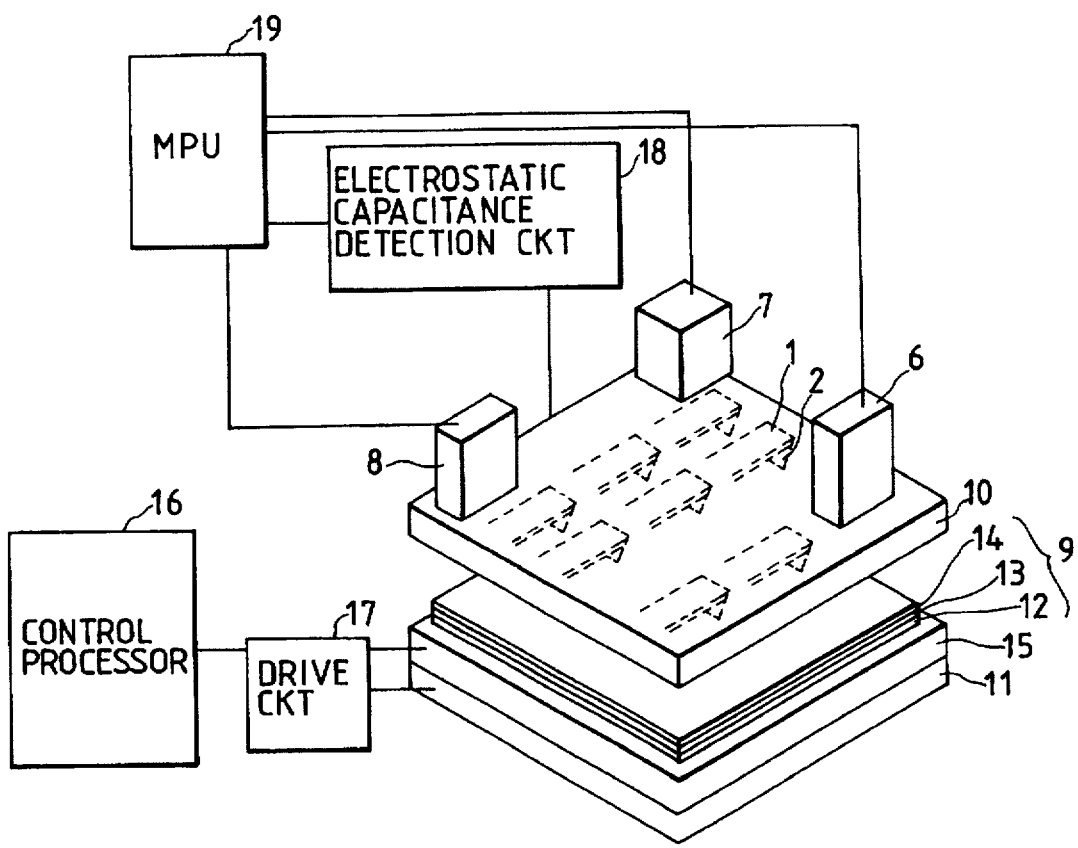
FIG. 4 is a view showing the arrangement of an information processing apparatus according to an embodiment of the present invention.

FIG. 4 shows the arrangement according to the first embodiment of the present invention. Referring to FIG. 4, m×n cantilevers 1 each consisting of an elastic member are arranged on an Si substrate 10. Tips 2 project from the distal end portions of the cantilever to oppose a recording medium 9. The cantilever 1 and the tip 2 constitute a probe. Tilt correction driving mechanisms 6, 7, and 8 which constitute interval adjustment means are respectively supported by corresponding housings (not shown), and are controlled by an MPU 19 to maintain parallelism (uniform intervals) of the probe-side substrate 10 with respect to the surface of the recording medium 9. The recording medium 9 is constituted by a glass substrate 12, a base electrode 13, and a recording layer 14, and its manufacturing method will be described later. The Si substrate, on which the m×n cantilevers 1 are formed, is arranged to oppose the recording medium 9 at a predetermined interval, and its tilt angle can be adjusted by the tilt correction driving mechanisms. A Z direction driving mechanism 11 adjusts the interval between the recording medium 9 and the Si substrate 10, and constitutes the interval adjustment means. An X-Y direction driving mechanism 15 moves and scans the recording medium 9 with respect to the Si substrate 9 in the X and Y directions. A control processor 16 outputs command signals to a driving circuit 17 upon recording/reproduction/erasing, and the like. The driving circuit 17 outputs driving signals to the X-Y and Z direction driving mechanism 15 and 11, and controls the positional relationship between the multi-probes and the recording medium. An electrostatic capacitance detection circuit 18 is connected to a plurality of electrodes (see FIGS. 3A and 3B) arranged on the opposing surfaces of the recording medium 9 and the probe-side Si substrate 10, which oppose each other, and detects electrostatic capacitances generated between the electrodes. The MPU 19 calculates the distance between the recording medium 9 and the Si substrate and the tilt angles between the two in the X and Y directions on the basis of the output from the electrostatic capacitance detection circuit 18, and outputs driving signals to the respective tilt correction driving mechanisms, so that the recording medium and the Si substrate become parallel to each other.

The probes used in this embodiment are manufactured as follows. A 0.3-μm. thick $SiO_2$ film is formed on the surface of an Si substrate 10 by thermal oxidation, and cantilever patterns, each having a length of 150 μm, and a width of 20 μm, of cantilevers 1 for recording/reproduction are formed on the $SiO_2$ film. Then, an electrical signal wiring pattern to the tips is formed, and anisotropic etching is performed from the substrate surface using a KOH solution, thus forming multi-cantilevers. Then, 5-μm high tips 2 are formed at the distal ends of the cantilevers by an electron beam deposition method of, e.g., carbon. The elastic modulus in flexure of the distal end of each of the multi-cantilevers, which are manufactured as described above, is about 0.01N/m. In consideration of warps of the individual cantilevers, process errors of the heights of the tips, and the like, the absolute value, in the height direction, of the distal end of each tip of the multi-cantilevers with reference to the Si substrate 10 is 15 microns, and a variation in position is about 1 μm. Also, a recording medium which has a three-dimensional pattern of about 1 μm on its surface is used.

On the probe-side substrate manufactured as described above, not only the probes, but also electrode patterns E1$i$ and E2$i$ having different thicknesses are formed, as shown in FIG. 3A. Also, electrode patterns E3$i$ are formed on the surface of the recording medium to oppose the above-mentioned electrode patterns (FIG. 3B). Each electrode pattern E1$i$ has a size of 100 microns ×50 microns, and a thickness of 1 micron, each electrode pattern E2$i$ has a size of 100 microns ×50 microns, and a thickness of 2 microns larger by 1 micron than that of the electrode pattern E1$i$, and each electrode pattern E3$i$ has a size of a square of 500 microns and a thickness of 1 micron.

The electrostatic capacitance detection circuit 18 detects the electrostatic capacitances between the electrodes E1$i$ and E2$i$, and the corresponding electrodes E3$i$. Then, the absolute distance between the first electrodes and the second electrode is calculated as a multiple of 1 micron, i.e., of the difference ($d_2$) between the thicknesses of the electrodes according to equation (1) above.

The probe-side substrate is uniformly brought close to the recording medium until the inter-electrode distance closest to the recording medium of the three detection positions becomes 20 microns.

The MPU 19 calculates the tilt angles between the probe-side substrate and the recording medium, and supplies values for correcting the calculated tilt angles to the correction driving mechanisms 6, 7, and 8 to correct the tilt angles.

In this embodiment, since the distance $d_1$ between the probe-side substrate and the recording medium is assumed to be 20 microns (for r=1), the ratio of the difference ($C_1-C_2$) between the electrostatic capacitances detected from the electrodes E1$i$ and E2$i$ to $C_2$ is 20. Thus, this S/N ratio is sufficient for the detection system, and easy detection is allowed. On the other hand, if the detection system is assumed to have a centuple S/N ratio with respect to a distance difference of several ten microns, $d_2$ must be several tenth microns. In practice, a case using electrodes having a thickness difference of 0.1 microns is the measurement limit. Since the electrodes for detecting the electrostatic capacitances cannot exceed the distance from the probe-side substrate to the tip distal end, each electrode must have a thickness of about 10 microns or less. Therefore, $d_2$, which is assumed to be 1 micron in this embodiment preferably falls within a range from 0.1 microns to 10 microns.

From this position, the probe-side substrate is brought close to the recording medium until currents are detected from all the probes. In this state, almost no tilt is present between the substrate and the recording medium, and the distance between the probes for recording/reproduction and the recording medium is shortened, thus attaining a state suitable for recording/reproduction. In this manner, the interval adjustment between the probe-side substrate and the recording medium is completed.

A method of performing recording/reproduction using the probes for recording/reproduction, which have been brought close to the recording medium by the above-mentioned operation will be described below.

The recording medium used in this embodiment was manufactured as follows using the Langmuir-Blodgett technique.

After an optically polished glass substrate 12 was cleaned using a neutral detergent and trichlene, a 50-Å thick Cr film was deposited as an undercoat layer by a vacuum deposition method, and a 400-Å thick Au film was deposited by the same method, thus forming a base electrode 13. A chloroform solution obtained by dissolving squarylium-bis-6-octyl azulene (to be abbreviated as SOAZ hereinafter) at a concentration of 0.2 mg/ml was developed on a wafer surface at 20°C., thus forming a monomolecular film on the wafer surface. After the solvent was evaporated, i.e., after the surface pressure of the monomolecular film was increased to 20 mN/m, the electrode substrate was slowly dipped at a rate of 5 mm/min to cross the wafer surface while maintaining the surface pressure to be constant, and was pulled up, thus forming a two-layered Y-shaped monomolecular film. With this operation, a recording medium 9 with a recording layer 14 was manufactured.

The recording medium 9 is supported on the X-Y direction driving mechanism 15.

Each probe is arranged, as shown in FIG. 5. Switch elements SR, SW, and SE are respectively connected to a reproducing bias applying G circuit 41, a recording pulse applying circuit 42, and an erasing pulse applying circuit 43. Signal lines d, e, and f supply control signals for the respective circuits.

Note that the switch elements are MOS switches formed on a silicon wafer by a known semiconductor technique.

Recording/reproduction/erasing experiments using the above-mentioned apparatus were conducted as follows.

In accordance with commands from the control processor 16, the multi-probes are located at desired recording positions using the driving circuit 17.

The switch element SR is always ON other than in recording and erasing operations, and currents of about 100 nA can be detected from the respective probes in the surface aligned state.

In this state, the switch element SW is turned on (recording). More specifically, the switch element SW is connected to a bias power supply of +6 V, and while the switch element SW is ON, pulses with a crest value of +6 V are applied between the probes and the recording medium. After the end of X-Y direction scanning, when the probes are returned to positions where the pulses were applied, the switch element SR is turned on in place of the switch element SW (reproduction), and the detected probe currents instantaneously increase to about 1 µA. That is, detection currents at the recording positions, which have increased by a factor of about ten, are read out (reproduction). Furthermore, when the probes have reached the recorded bit positions by another X-Y direction scanning, the switch element SE is turned on in place of the switch element SR (erasing), and pulses with a crest value of −4 V are applied to the recording medium. As a result, the probe currents detected at these positions return to 100 nA. The above-mentioned recording/reproduction/erasing operations can be stably repeated.

The second embodiment of the present invention will be described below. In the second embodiment, movement in the horizontal direction is added to the first embodiment.

The second embodiment of the present invention will be described below with reference to FIGS. 6A to 7B. FIG. 6A is a bottom view showing the electrode arrangement on a probe-side substrate. FIG. 6B is an enlarged sectional view of the electrode arrangement taken along a line VIB—VIB shown in FIG. 6A. FIG. 7A is a top view showing the electrode arrangement on the recording medium side. FIG. 7B is an enlarged sectional view of the electrode arrangement taken along a line VIIB—VIIB shown in FIG. 7A.

Figure 8:
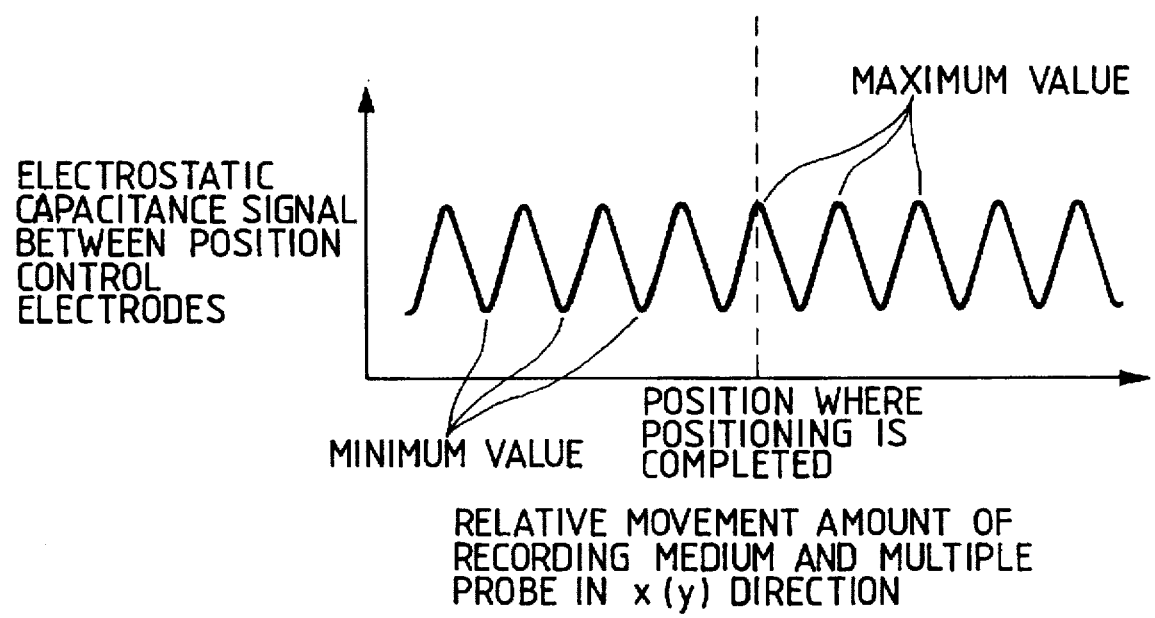
FIG. 8 is a waveform chart of an electrostatic capacitance signal for position control in the x (y) direction.

In the second embodiment, as shown in FIGS. 6A and 6B, electrodes a and b with different thicknesses as in the first embodiment, and an interdigital electrode d extending along the moving direction are formed on a probe-side substrate 10. On the other hand, a common electrode c opposing the electrodes a and b, and an interdigital electrode opposing the electrode d are formed on the recording medium side, as shown in FIGS. 7A and 7B. The parallelism of the surfaces can be adjusted on the basis of the electrostatic capacitance detection outputs from the electrodes a, b, and c as in the first embodiment. When a stage is moved in the horizontal direction, a modulated output waveform shown in FIG. 8 is obtained upon detection of the electrostatic capacitance between the interdigital electrodes d and e. Based on the peak positions of this waveform, the position in the horizontal direction can be adjusted. In this embodiment, since the lines and spaces of the interdigital electrodes d and e are set to be 30 microns, peaks are detected upon every movement by 30 microns. For this reason, since the recording medium surface is accessed on the basis of this reference signal, recorded bits need not be accessed, and movement in the surface direction is not required upon movement, thus achieving a high access speed.

The recording/reproduction operation at the respective points after movement is performed in the same manner as in the first embodiment.

As described above, one of the first electrode group on the probe side and the second electrode group on the recording medium side is constituted by a plurality of electrode patterns with different electrode end face positions, the electrostatic capacitances between the first and second electrodes are detected, and absolute distance information between the electrodes is extracted from the detected values to perform tilt correction. For this reason, since the interval adjustment can be achieved by an open loop system without using a feedback system, the access speed of information processing can be increased. Since the electrostatic capacitances to be detected and distances need not be calibrated, the manufacturing cost can be reduced, and the service life can be prolonged.

In addition, even when the present invention is used in positioning upon movement in the horizontal direction, easy control can be assured without changing the inter-electrode distances.

What is claimed is:

1. An information processing apparatus for recording and/or reproducing information on and/or from a recording medium using a plurality of probes, comprising:

a plurality of probes;

a substrate supporting said plurality of probes;

a first plate electrode provided on said substrate;

a second plate electrode provided on said recording medium to face said first plate electrode;

means for detecting an electrostatic capacitance between said first and second plate electrodes; and means for adjusting an interval between said substrate and said recording medium on the basis of a detection result provided by said detection means, wherein one of said first and second plate electrodes includes a plurality of plate electrodes having different thicknesses.

2. An apparatus according to claim 1, wherein a difference in heights of the plurality of electrode end faces falls within a range from 0.1 micron to 10 microns.

3. An apparatus according to claim 1, wherein said first plate electrode comprises a plurality of plate electrodes, and said plurality of plate electrodes are arranged at different positions on said substrate.

4. An apparatus according to claim 3, wherein said second plate electrode comprises a plurality of plate electrodes, and said plurality of plate electrodes of said second plate electrode are arranged to oppose said plurality of plate electrodes of said first plate electrode.

5. An apparatus according to claim 4, wherein one of plate said plurality of electrodes of said first plate electrode and one of plate said plurality of electrodes of said second plate electrode are interdigital plate electrodes.

6. A method for adjusting an interval between a substrate and a recording medium in an information processing apparatus comprising a plurality of probes supported on the substrate, a first plate electrode provided on the substrate, a second plate electrode provided on the recording medium to face the first plate electrode, means for detecting an electrostatic capacitance between the first and second plate electrodes, means for adjusting the interval between the substrate and the recording medium on the basis of a detection result provided by the detection means, wherein one of the first and second plate electrodes includes a plurality of plate electrodes having different thicknesses, said method comprising the steps of:

detecting an electrostatic capacitance between each of the plurality of electrodes having the different heights of the end faces and the other electrode facing said plurality of electrodes, using the detecting means;

calculating a distance between the first plate electrode and the second plate electrode from the detected electrostatic capacitances and a difference of the thicknesses; and adjusting the interval between the recording medium and the substrate on the basis of the calculated distance, using the adjusting means.

* * * * *

UNITED STATES PATENT AND TRADEMARK OFFICE
CERTIFICATE OF CORRECTION

PATENT NO. : 5,717,680

DATED : February 10, 1998

INVENTOR(S): AKIHIKO YAMANO ET AL.

It is certified that error appears in the above-identified patent and that said Letters Patent is hereby corrected as shown below:

[57] ABSTRACT

Line 11, "electrodes" should read --electrode--.

COLUMN 2

Line 21, "arrangement" should read --arranged--.

COLUMN 3

Line 14, "part" should read --parts--.
   Line 20, "th" should read --the--.

COLUMN 4

Line 37, "0.3-μm," should read --0.3-μm--.

COLUMN 5

Line 23, "ten" should read --tens of--.
   Line 24, "tenth microns" should read --tenths of a micron--.

COLUMN 6

Line 3, "G circuit" should read --circuit--.

UNITED STATES PATENT AND TRADEMARK OFFICE
CERTIFICATE OF CORRECTION

PATENT NO. : 5,717,680

DATED : February 10, 1998

INVENTOR(S) : AKIHIKO YAMANO ET AL.

It is certified that error appears in the above-identified patent and that said Letters Patent is hereby corrected as shown below:

<u>COLUMN 8</u>

Line 13, "plate" should be deleted.
    Line 14, "plurality of" should read --plurality of
       plate--.
    Line 15, "of plate" should read --of--, and
       "plurality of" should read --plurality of plate--.

Signed and Sealed this

Twenty-ninth Day of September, 1998

Attest:

BRUCE LEHMAN

Attesting Officer     Commissioner of Patents and Trademarks